United States Patent [19]

Nopanen et al.

[11] Patent Number: 5,653,161

[45] Date of Patent: *Aug. 5, 1997

[54] FOOD STEAMER WITH PRESSURE VENTING

[75] Inventors: Esko Nopanen, Shelton; Craig A. DuBois, Trumbull; Robert C. Kass, Fairfield, all of Conn.

[73] Assignee: Black & Decker Inc., Newark, Del.

[*] Notice: The term of this patent shall not extend beyond the expiration date of Pat. No. 5,584,235.

[21] Appl. No.: 587,317

[22] Filed: Jan. 16, 1996

Related U.S. Application Data

[63] Continuation-in-part of Ser. No. 574,065, Dec. 15, 1995, Pat. No. 5,584,235.

[51] Int. Cl.$^6$ ............................................. A47J 27/04
[52] U.S. Cl. ........................ 99/415; 99/417; 99/446; 126/369; 219/401
[58] Field of Search ............................ 99/410, 411, 412, 99/413, 414, 415, 416, 417, 418, 446; 126/369; 219/401

[56] References Cited

U.S. PATENT DOCUMENTS

| | | | |
|---|---|---|---|
| 448,886 | 3/1891 | Perry | 126/369 |
| 481,316 | 8/1892 | Thurston | 126/369 |
| 1,130,519 | 3/1915 | Keller | 126/369 |
| 1,245,711 | 11/1917 | Happer. | |
| 1,245,712 | 11/1917 | Happer. | |
| 2,967,023 | 1/1961 | Huckabee | 239/60 |
| 3,078,783 | 2/1963 | Lee, Sr. | 99/259 |
| 3,088,393 | 5/1963 | Huckabee | 99/259 |
| 3,117,510 | 1/1964 | Irwin | 99/260 |
| 3,528,401 | 9/1970 | Moore | 126/369 |
| 4,397,298 | 8/1983 | Abell | 126/369 |
| 4,462,308 | 7/1984 | Wang | 99/413 |
| 4,509,412 | 4/1985 | Whittenburg et al. | 99/331 |
| 4,574,776 | 3/1986 | Hidle | 126/369 |
| 4,650,968 | 3/1987 | Williams | 219/401 |
| 4,762,056 | 8/1988 | Virag | 99/345 |
| 5,097,753 | 3/1992 | Naft | 99/341 |
| 5,176,067 | 1/1993 | Higgins | 99/340 |
| 5,191,831 | 3/1993 | Walden | 99/446 |
| 5,275,094 | 1/1994 | Naft | 99/416 |
| 5,287,798 | 2/1994 | Takeda | 99/413 |
| 5,363,748 | 11/1994 | Boehm et al. | 99/372 |
| 5,400,701 | 3/1995 | Sham | 99/410 |

*Primary Examiner*—Reginald L. Alexander
*Attorney, Agent, or Firm*—Barry E. Deutsch

[57] ABSTRACT

A food steamer having a base, a combined support and collector, and a cooking bowl. The base has a heater and a reservoir for holding water to be heated into steam. The cooking bowl is mounted on top of the base and has a bottom with holes. The combined support and collector has a frame and a screen. The frame is mounted to the base between the heater and the cooking bowl. The frame has a center aperture with the screen located therein for supporting flavoring items thereon. The frame has raised walls to form a condensed steam holding area for holding all condensed steam that has traveled into and then back out of the holes in the cooking bowl. The frame also has a side wall with inwardly recessed grooves and holes through the frame at the tops of the grooves. These form pressure release vents at the sides of the frame.

18 Claims, 3 Drawing Sheets

FOOD STEAMER WITH PRESSURE VENTING

CROSS-REFERENCE TO RELATED APPLICATION

This is a continuation-in-part patent application of U.S. patent application Ser. No. 08/574,065 (Attorney Docket No: P-US-BP-0254), filed Dec. 15, 1995 now U.S. Pat. No. 5,584,235, issued Dec. 17, 1996.

BACKGROUND OF THE INVENTION

1. Field of the Invention

The present invention relates to food steamers and, more particularly, to venting pressure in a food steamer.

2. Prior Art

U.S. Pat. No. 5,275,094 discloses a food steamer having a base, a food cooker, and an insert between the two that collects all condensed steam that has traveled into and then back out of holes in a bottom of the cooking bowl. U.S. Pat. No. 3,078,783 discloses a pressure cooker with a well that holds both water. The well is used to turn water into steam and food flavoring substance is burned in the well during cooking. U.S. Pat. No. 4,762,056 discloses a container for storing and also cooking food and flavorings together. Other relevant art include the following:

U.S. Pat. No. : 1,245,711, U.S. Pat. No. : 1,245,712, U.S. Pat. No. : 2,967,023, U.S. Pat. No. : 3,088,393, U.S. Pat. No. : 3,117,510, U.S. Pat. No. : 4,509,412, U.S. Pat. No. : 5,097,753, U.S. Pat. No. : 5,176,067, U.S. Pat. No. : 5,191,831, U.S. Pat. No. : 5,363,748

SUMMARY OF THE INVENTION

In accordance with one embodiment of the present invention a food steamer is provided comprising a base, a condensed steam collector tray, and a cooking bowl. The base has a heater and a first holding area for holding water to be heated into steam. The collector tray is mounted to the base above the heater and has a main aperture located above the heater and a second holding area located around the main aperture. The cooking bowl is mounted on top of the collector tray and has a bottom with holes therethrough. The holes are located only above the second holding area. The collector tray has an inwardly recessed area at a side of the tray that forms a steam vent from the first holding area to the second holding area between the side of the tray and an inner side of the base.

In accordance with another embodiment of the present invention, in a steam food steamer having a base with a first area for holding water to be turned into steam, a container for holding food to be steam cooked, and a tray mounted on the base having a separate second area for collecting all condensed steam that has travelled into and then back out of holes in a bottom of the container, the improvement comprises a pressure steam vent extending at a side of the first area along an exterior side of the tray between the base and the tray.

In accordance with another embodiment of the present invention, a food steamer is provided comprising a base, a combined support and collector, and a cooking bowl. The base has a first holding area for holding water to be heated into steam and a heater. The collector is mounted to the base and has a frame with a general ring shape and a support screen attached to the frame. The frame has a main aperture to allow steam to travel upward past the frame. The support screen is located in the main aperture. The frame has a pressure vent hole therethrough. The cooking bowl is mounted on top of the combined support and collector and has a bottom with holes therethrough.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
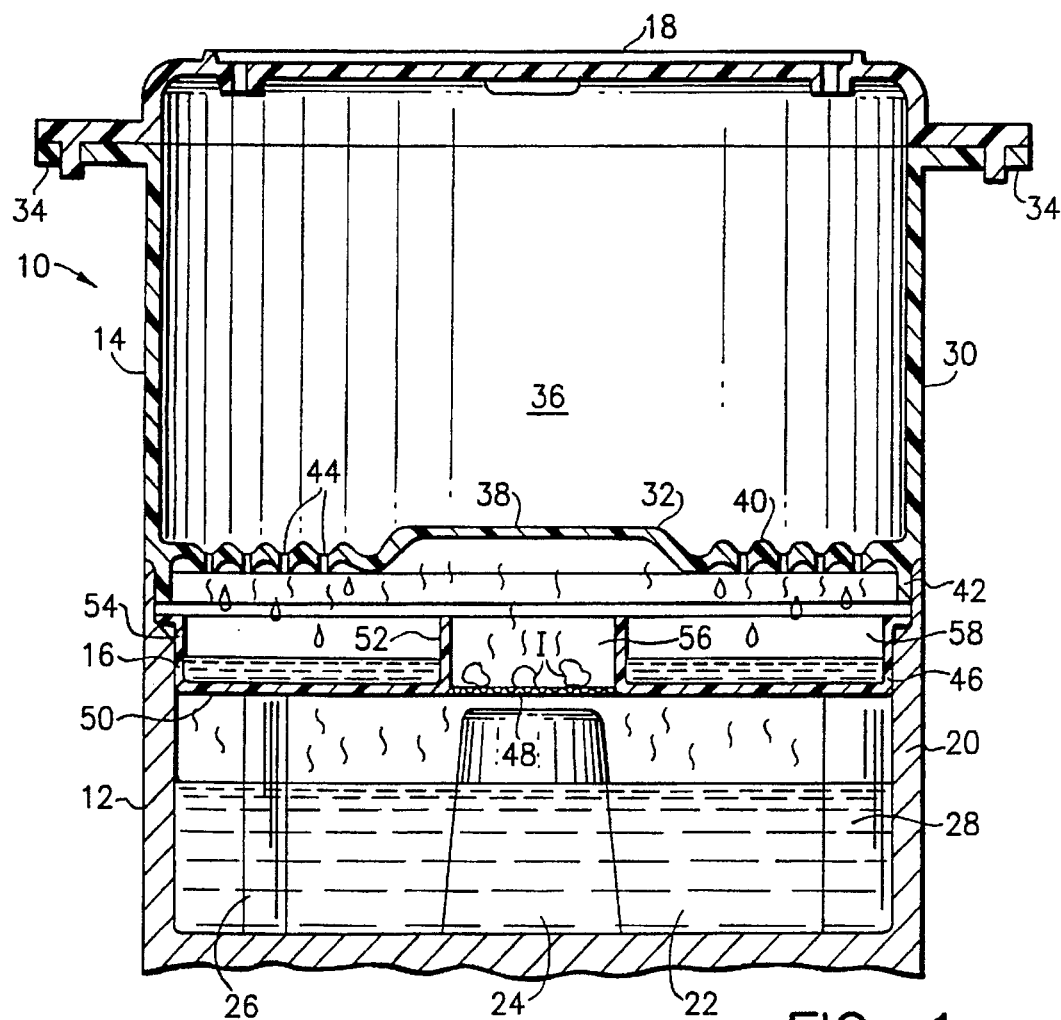
FIG. 1 is a partial cross-sectional view of a food steamer incorporating features of the present invention.

Referring to FIG. 1, there is shown a partial cross-sectional view of a food steamer 10 incorporating features of the present invention. Although the present invention will be described with reference to the embodiments shown in the drawings, it should be understood that features of the present invention can be embodied in many forms of alternate embodiments. In addition, any suitable size, shape or type of elements or materials could be used.

The steamer 10 generally comprises a base 12, a cooking bowl 14, a combined support and collector 16, and a cover 18. The base 12 has a wall 20 that defines a first holding area or reservoir 22 for holding a liquid, such as water, to be heated into steam. A heating element or heater 24 is mounted in the reservoir 22. The heating element 24 is adapted to heat liquid in the reservoir 22 into steam. Thus, the reservoir 22 is also a boiling chamber. The heating element 24 is centrally mounted in the reservoir 22. In alternate embodiments any suitable type of heating element could be used. The base 12 also preferably comprises an ON/OFF switch (not shown) and an electrical cord (not shown) for connecting the heating element 24 to a power source. The wall 20 also includes support feet 26 (only one of which is shown) and a support pad 28.

The cooking bowl 14 is removably supported on the top of the base 12. The bowl 14 includes an outer wall 30, a bottom 32, and extensions 34 on the top of the wall 30. The walls 30, 32 form a food holding area 36. The bottom 32 includes a center closed area or imperforate section 38, a perforated section 40, and a mounting rim 42. The mounting rim 42 combines with the top of the base 12 to stably mount the bowl 14 on top of the base 12. However, any suitable means could be provided to removably connect the bowl with the base. The perforated section 40 has a general circular ring shape with the imperforate center area 38 in the middle. The perforated section 40 has a wavy surface with holes 44 therethrough. The center area 38 does not have holes. In alternate embodiments, other types of bowls could be used. The cover 18 is removably mounted to the top of the bowl 14.

Figure 2:
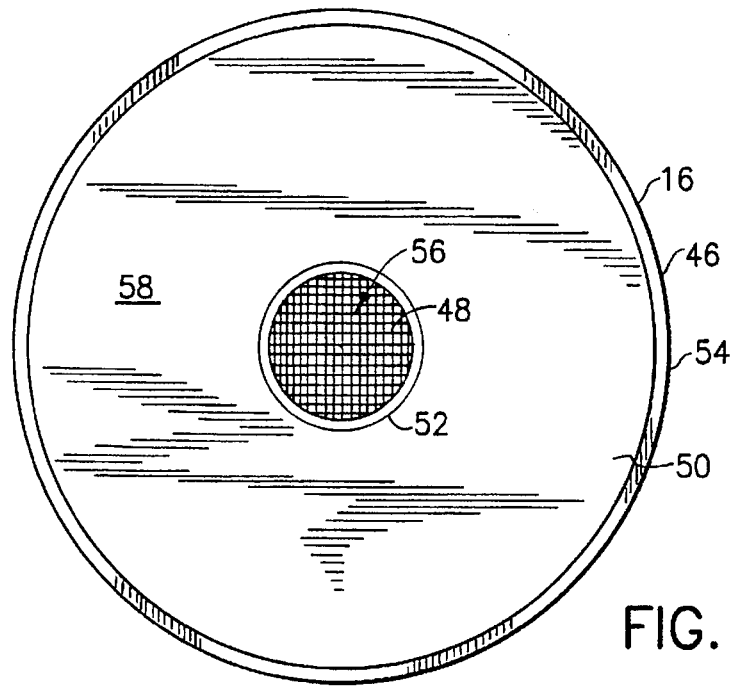
FIG. 2 is a plan top view of the combined support and collector used in the food steamer shown in FIG. 1.

Referring also to FIG. 2, the combined support and collector 16 generally comprises a frame 46 and a support screen 48. The frame 46 is a one-piece member having a general ring shape. The frame 46 has a bottom wall 50, an inner wall 52 and an outer wall 54. The inner wall 52 defines a center aperture 56. The walls 50, 52, 54 are imperforate to thereby form a second holding area 58. The screen 48 is attached to the frame 46 at the bottom of the center aperture 56. In an alternate embodiment, the screen could be integrally formed with the frame 46. The collector 16 is mounted inside the base 12 and is supported on the base 12 by a rim 60 and the pad 28 and feet 26. Because the heating element 24, aperture 56 and center area 38 of the bottom of the bowl are all centrally located, they are vertically aligned with one another. Likewise, the wavy perforated section 40 of the bottom of the bowl is aligned over the second holding area 58.

The principal difference between the present invention and the prior art food steamer disclosed in U.S. Pat. No. 5,275,094, is in regard to the collector 16. In the present invention the collector provides two functions. First, similar to the ring-like member in U.S. Pat. No. 5,275,094, the collector 16 is adapted to allow steam to pass through the center aperture 56 from the reservoir 22 and into the bowl 14 through the holes 44. Condensed steam in the bowl 14 can exit through the holes 44 and be collected in the second holding area 58. This separate holding area for condensed steam and drippings from the cooking food reduces the build-up of any unwanted residue on the heating element 24 and reduces the need for cleaning of the boiling chamber or reservoir 22. The second function is the ability of the collector 16 to support items I on the screen 48 in the path of steam flow through the center steam aperture 56. The items I can include herbs, spices, or any other suitable type of food flavoring item.

With the increase in the trend of healthier eating there has been an increase in the use of steamers. Steaming food provides an easy way to cook vegetables without losing their nutritional value. To improve the taste, toppings or spices have been added after cooking. However, these toppings are not absorbed into the food. They are only mixed while being eaten.

The present invention provides a space to put herbs and spices so that they will be incorporated into the steam as the food is being cooked. This space is located in the opening where steam flows from the boiling chamber 22 into the food area. By using the inner wall 52 to form the chamber to hold the items I, only the screen 48 needs to be added. None of the other components of the steamer 10 need to be redesigned. The screen 48 is able to hold the items I and also allow the steam to pass therethrough. The steamer 10 can be used with or without flavoring items and the steamer 10 does not need to be reconfigured when used with or without flavoring items. The advantage of putting the herbs and spices in the steamer while the food is cooking is that the foods can now absorb the flavors throughout as they cook. The addition of the herbs and spices allows the cook to experiment with new flavors to enhance the taste of fresh vegetables and other food. By separating the herbs and spices from the boiling water, cleaning of the boiling chamber 22 is reduced and the build up of any unwanted reside at the heater 24 is reduced.

Figure 3:
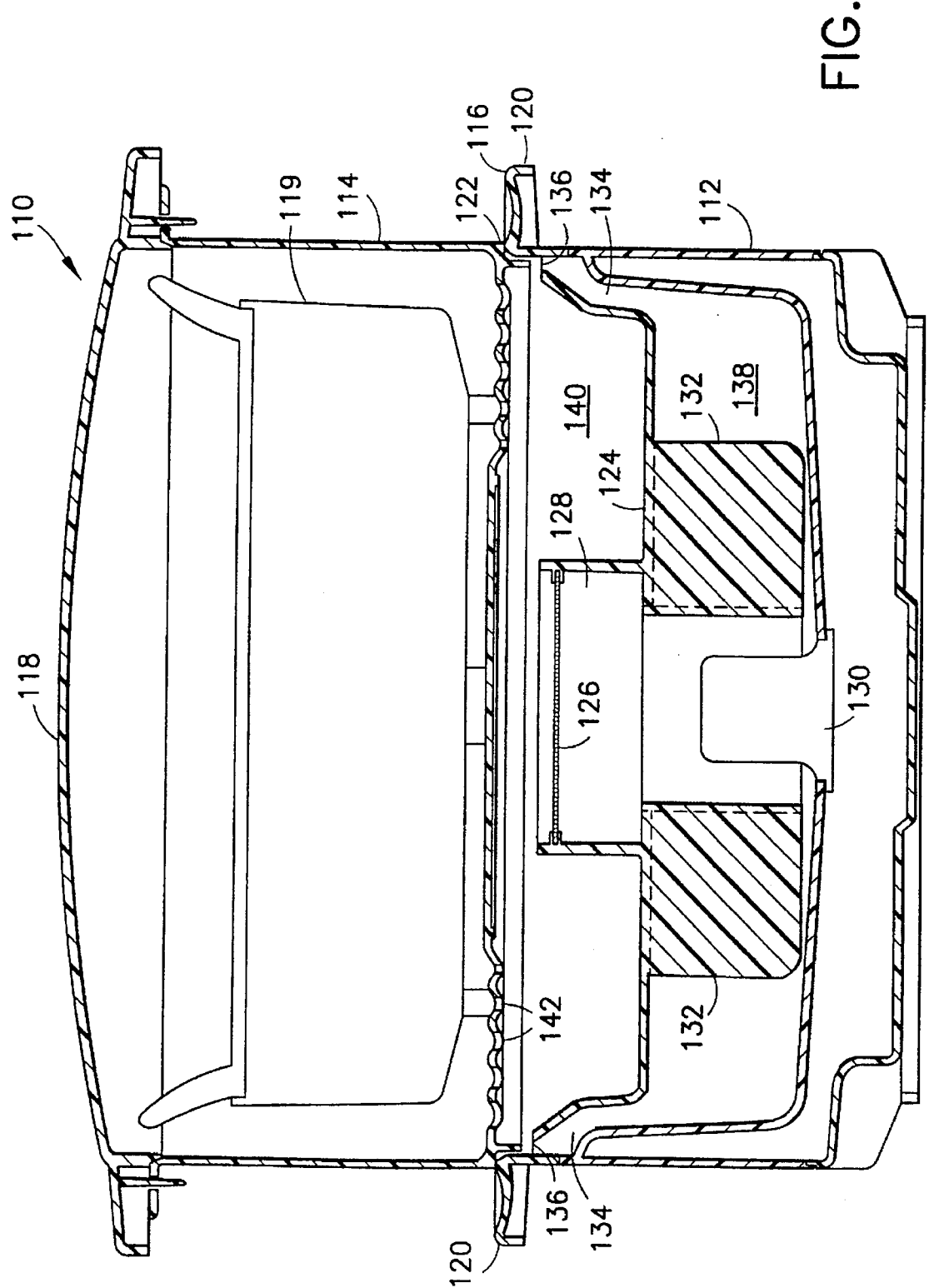
FIG. 3 is a schematic cross-sectional view of an alternate embodiment of the present invention.
Figure 4:
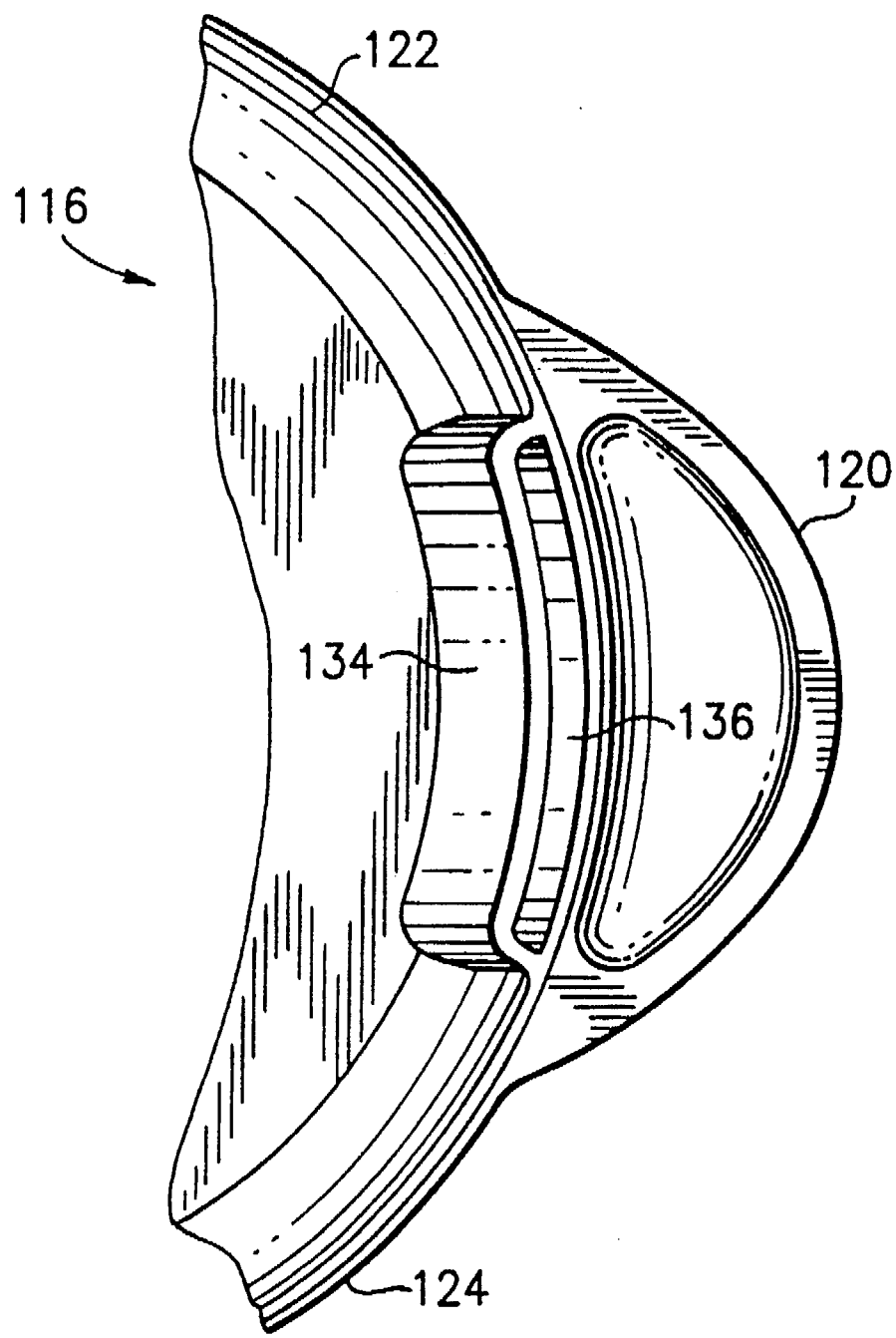
FIG. 4 is a partial top plan view of the collector used in the food steamer shown in FIG. 3.

Referring now to FIGS. 3 and 4, an alternate embodiment of the present invention will be described. The food steamer 110 has a base 112, a cooking bowl 114, a combined support and collector tray 116, a cover 118 and an inner food support bowl 119. The combined support and collector tray 116 has a general tray profile with two handles 120. The tray 116 has a circular sealing rim portion 122 that is sandwiched between the base 112 and the bowl 114. The tray 116 generally comprises the frame 124 and the screen 126. The frame 124 has a center main aperture 128. The cross-sectional area of the main aperture 128 increases from the bottom of the main aperture to its top. The screen 126 is located at the top of the main aperture 128. The frame 124 surrounds a portion of the heater 130 at the bottom of the main aperture 128. Support ribs 132 are also provided on the bottom of the frame 124. Located at the exterior sides of the frame 124 are two inwardly recessed portions or grooves 134. The frame 124 also has holes 136 therethrough at the tops of the grooves 134. The holes 136 are located inward relative to the sealing rim portion 122 proximate the handles 120.

As seen in FIG. 3, the grooves 134 and holes 136 form pressure vents from the first water holding area 138 to the second holding area 140 of the tray 116. The holes 136 are located past the outer perimeter of the holes 142 in the bottom of the cooking bowl 114. This helps to insure that drippings from the bowl 114 do not inadvertently pass into the holes 136. At times during the heating of water into steam at the heater 130, steam is produced faster than can be vented through the main aperture 128 in the tray 116. This may occur more often if the support screen 126 is crowded with a generous amount of flavoring items. However, the provision of the pressure vents at the grooves 134 and holes 136 allows excess pressure to vent therethrough. This vented steam is still used to cook food in the bowl 114, but merely has not been flavored by the flavoring items. However, because of the central location of the heater 130, the relative position of the main aperture 128 at the heater 130, and the fact that the pressure vents are located at the outer sides of the tray 116, the majority of steam is still directed up through the flavoring items on the screen 126. Thus, this embodiment still provides good flavoring capabilities, but prevents excessive pressure buildup on the bottom side of the drip tray 116. In an alternate embodiment, the tray 116 could be provided without the screen 126.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A food steamer comprising:
   a base having a heater and a first holding area for holding water to be heated into steam;
   a condensed steam collector tray mounted to the base above the heater, the collector tray having a main aperture located above the heater and a second holding area located around the main aperture; and
   a cooking bowl mounted on top of the collector tray and having a bottom with holes therethrough, the holes being located only above the second holding area,
   wherein the collector tray has an inwardly recessed area at a side of the tray that forms a steam vent from the first holding area to the second holding area between the side of the tray and an inner side of the base.

2. A steamer as in claim 1 wherein the tray has a frame with a raised wall around the main aperture and a support screen mounted to the frame in the main aperture.

3. A steamer as in claim 2 wherein the frame has a hole therethrough at a top of the inwardly recessed area.

4. A steamer as in claim 2 wherein the second holding area has a general ring shape with the main aperture located in the middle of the general ring shape.

5. A steamer as in claim 1 wherein the tray has two inwardly recessed areas at opposite sides of the tray.

6. A steamer as in claim 5 wherein the tray has holes at a top of the inwardly recessed areas.

7. A steamer as in claim 6 wherein the tray has handles located outwardly from the holes.

8. A steamer as in claim 1 wherein the main aperture increases in cross-sectional area between a bottom of the main aperture and a top of the main aperture.

9. A steamer as in claim 1 wherein the tray has an outwardly angled flange shape at a top interior side of the inwardly recessed area.

10. In a food steamer having a base with a first area for holding water to be turned into steam, a container spaced above said first area for holding food to be steam cooked, and a tray mounted on the base having a separate second area for collecting all condensed steam that has travelled into and then back out of holes in a bottom of the container, wherein the improvement comprises:

a primary steam path for distributing steam formed in the first area into said container through said holes; and a secondary steam path spaced from said primary steam path including a pressure steam vent extending at a side of the first area along an exterior side of the tray between the base and the tray.

11. A steamer as in claim 10 wherein the tray has a vent hole therethrough at a top of the steam vent.

12. A steamer as in claim 11 wherein the tray is sandwiched between the base and the container along a sealing rim portion of the tray with the hole being located inwardly from the sealing rim portion.

13. A steamer as in claim 12 wherein the tray has a handle that extends outward past the sealing rim portion proximate the hole.

14. A steamer as in claim 10 wherein the tray has a center aperture with the second area surrounding the center aperture, and the tray also has a flavoring support in the center aperture.

15. A food steamer comprising:

a base having a first holding area for holding water to be heated into steam and a heater;

a combined support and collector mounted to the base and having a frame with a general ring shape and a support screen attached to the frame, the frame having a main aperture to allow steam to travel upward past the frame, the support screen being located in the main aperture, and the frame having a pressure vent hole therethrough; and a cooking bowl mounted on top of the combined support and collector having a bottom with holes therethrough, said support and collector retaining condensate and drippings formed in said cooking bowl and flowing through said holes.

16. A steamer as in claim 15 wherein the frame has an inwardly recessed area along a side of the frame with the pressure vent hole located at a top of the inwardly recessed area.

17. A steamer as in claim 15 wherein the tray is sandwiched between the base and the container along a sealing rim portion of the tray with the hole being located inwardly relative to the sealing rim portion.

18. A steamer as in claim 17 wherein the tray includes a handle that extends outward from the sealing rim portion proximate the pressure vent hole.

* * * * *